(12) United States Patent
Sun

(10) Patent No.: US 8,662,462 B2
(45) Date of Patent: Mar. 4, 2014

(54) SUSPENSION APPARATUS AND DEVICE USING THE SAME

(75) Inventor: Zheng-Heng Sun, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 192 days.

(21) Appl. No.: 13/163,757

(22) Filed: Jun. 20, 2011

(65) Prior Publication Data

US 2012/0298823 A1 Nov. 29, 2012

(30) Foreign Application Priority Data

May 23, 2011 (CN) .......................... 2011 1 0133631

(51) Int. Cl.
*A47F 5/08* (2006.01)

(52) U.S. Cl.
USPC .................... 248/231.9; 248/222.12; 248/925

(58) Field of Classification Search
USPC ................ 248/51, 52, 56, 62, 63, 71, 221.12, 248/222.11, 222.12, 231.91, 316.3, 551, 248/231.9, 320, 322, 925
See application file for complete search history.

(56) References Cited

U.S. PATENT DOCUMENTS

| | | | | |
|---|---|---|---|---|
| 786,961 | A * | 4/1905 | Drakes | 292/27 |
| 3,640,497 | A * | 2/1972 | Waki | 248/220.41 |
| 3,722,239 | A * | 3/1973 | Mestre | 70/212 |
| 3,815,756 | A * | 6/1974 | Cox | 211/57.1 |
| 4,041,668 | A * | 8/1977 | Jahn et al. | 52/506.09 |
| 4,145,840 | A * | 3/1979 | Davidson | 47/44 |
| 4,586,686 | A * | 5/1986 | Cason | 248/231.9 |
| 4,607,991 | A * | 8/1986 | Porter | 410/110 |
| 5,791,171 | A * | 8/1998 | Kelley | 70/58 |
| 6,058,744 | A * | 5/2000 | Ling | 70/28 |
| 6,880,373 | B2 * | 4/2005 | Ling | 70/58 |
| 7,234,326 | B1 * | 6/2007 | Lu | 70/58 |
| 7,331,203 | B2 * | 2/2008 | Lee | 70/14 |
| 7,401,481 | B1 * | 7/2008 | Lin | 70/14 |

FOREIGN PATENT DOCUMENTS

| | | |
|---|---|---|
| TW | 489900 | 6/2002 |
| TW | 585291 | 4/2004 |

* cited by examiner

*Primary Examiner* — Gwendolyn W Baxter
(74) *Attorney, Agent, or Firm* — Altis Law Group, Inc.

(57) ABSTRACT

A suspension apparatus includes a casing, a fixing member received in the casing, and a hanging portion extending from a first end of the casing. The fixing member includes two latches. First ends of the latches are rotatably connected to each other. Each latch includes a tab extending from a second end of the latch and extending through a second end of the casing, and an operation portion extending from the latch and extending through one of opposite sides of the casing. The latches to rotate relative to each other to drive the tabs of the latches closer or farther apart.

17 Claims, 5 Drawing Sheets

SUSPENSION APPARATUS AND DEVICE USING THE SAME

BACKGROUND

1. Technical Field

The present disclosure relates to a device with a suspension apparatus.

2. Description of Related Art

Many portable devices, such as notebook computers, are often put on desktop after being used, and will occupy large space of the desktop, which is inconvenient.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
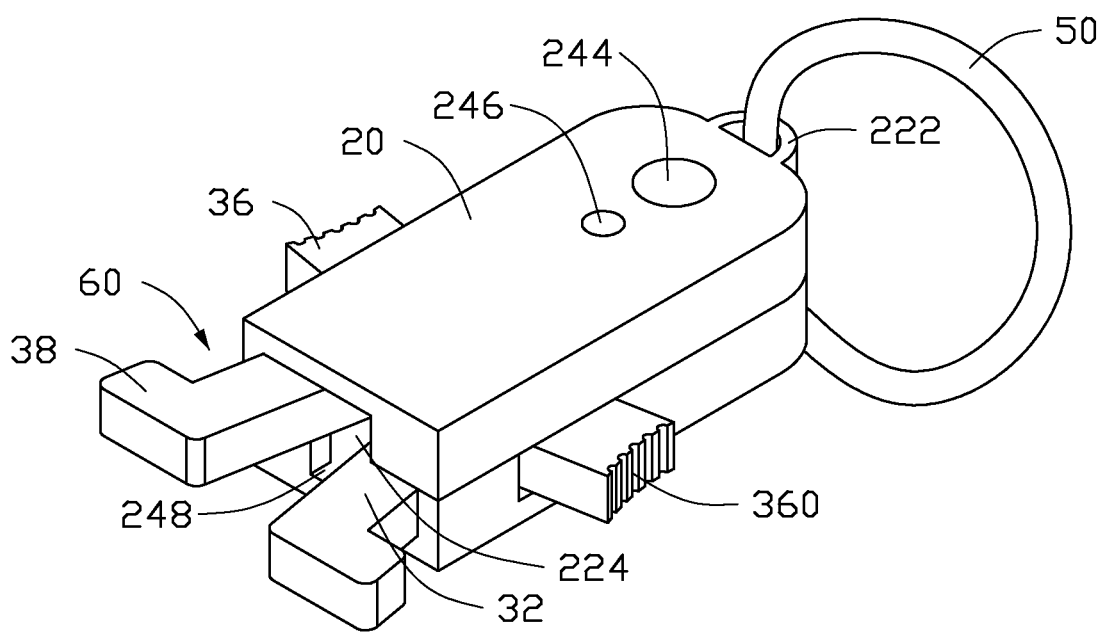
FIG. 1 is an assembled, isometric view of an exemplary embodiment of a suspension apparatus; the suspension apparatus includes a fixing member and a casing.
Figure 5:
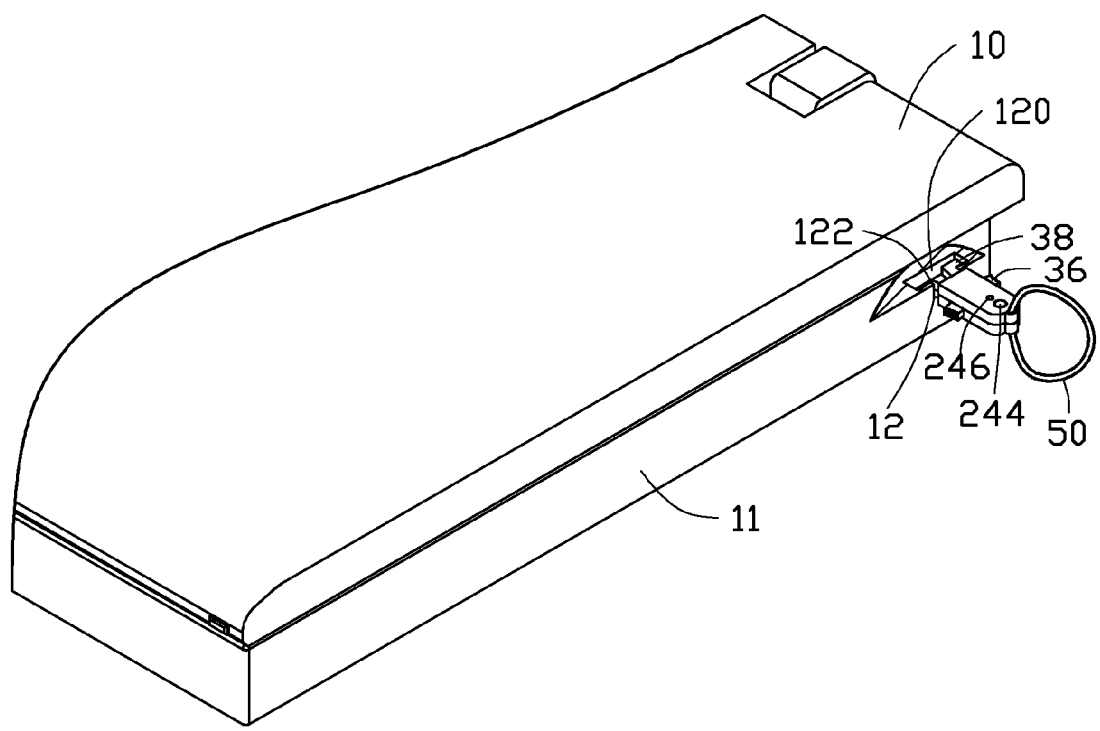
FIG. 5 is an assembled, isometric view of the suspension apparatus of FIG. 1 and a notebook computer.

Referring to FIGS. 1 and 5, an exemplary embodiment of a suspension apparatus for hanging a portable device, such as a notebook computer 10, includes a casing 20, a fixing member 60, and a hanging portion 50. The notebook computer 10 defines a substantially T-shaped fixing hole 12 in a sidewall 11 of the notebook computer 10. The T-shaped fixing hole 12 includes a larger part 120 defined in the sidewall 11, and a smaller part 122 communicating the larger part 120 and the outside.

Figure 2:
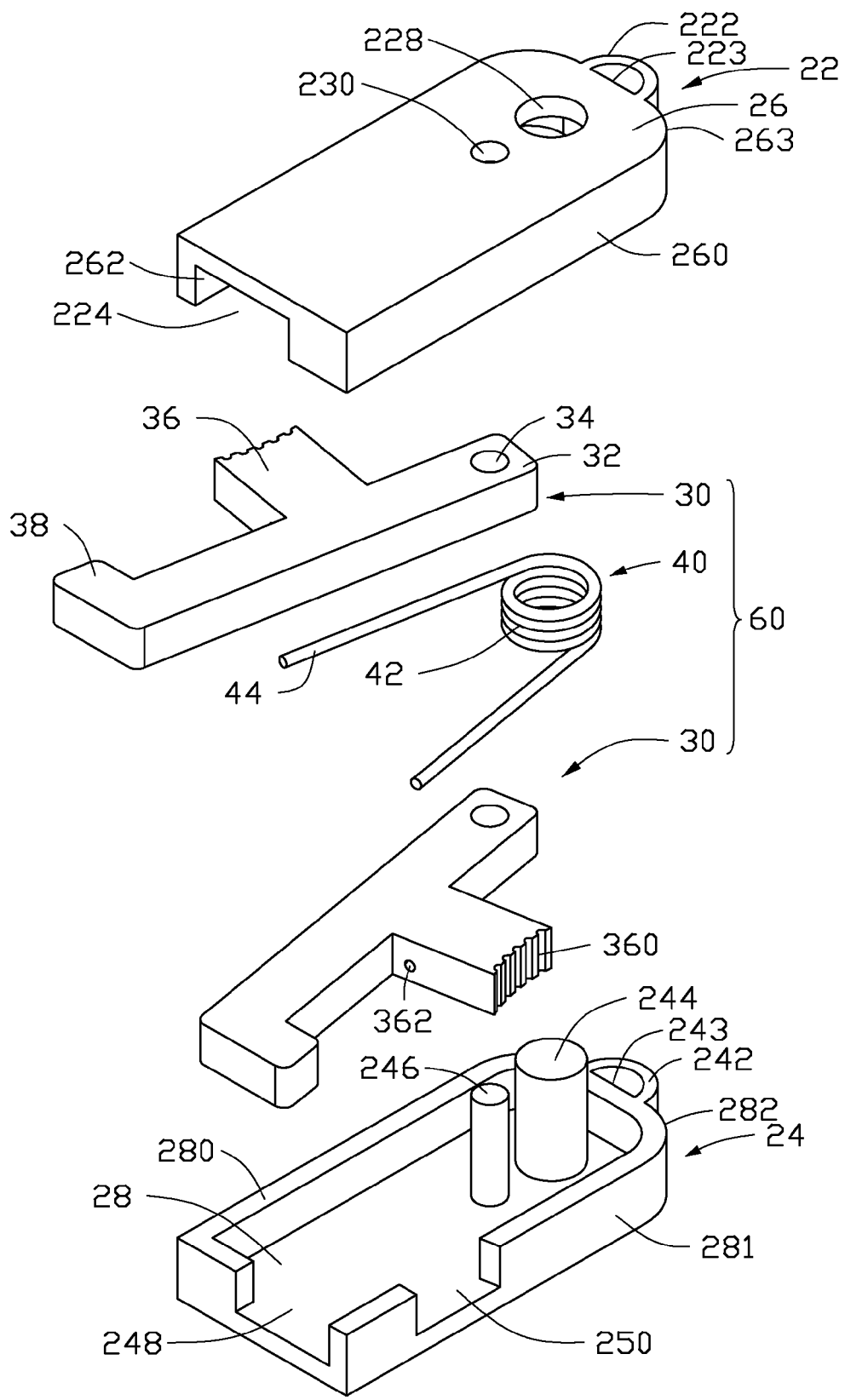
FIG. 2 is an exploded, isometric view of FIG. 1, the casing includes a first holder and a second holder.

Referring to FIG. 2, the casing 20 includes a first holder 22 and a second holder 24.

The first holder 22 includes a substantially rectangular board 26, a first sidewall 260 substantially perpendicularly extending from a first side of the board 26, a second sidewall 262 substantially perpendicularly extending from a second side of the board 26, and an end wall 263 substantially perpendicularly extending from a first end of the board 26. A projection 222 defining a hook hole 223 is formed on the end wall 263. An opening 224 is defined in a second end of the first holder 22, adjacent to the second sidewall 262. A slot (not shown) is defined in the second sidewall 262, adjacent to the opening 224. The board 26 defines a first through hole 228 adjacent to the projection 222, and a second through hole 230 adjacent to the first hole 228 opposite to the projection 222. The diameter of the first through hole 228 is greater than the diameter of the second through hole 230.

The second holder 24 includes a substantially rectangular board 28, a first sidewall 281 substantially perpendicularly extending from a first side of the board 28, a second sidewall 280 substantially perpendicularly extending from a second side of the board 28, and an end wall 282 substantially perpendicularly extending from a first end of the board 28. A projection 242 defining a hook hole 243 is formed on the end wall 282. The board 28 forms a first post 244 and a second post 246 adjacent to the projection 242, respectively corresponding to the first and second through holes 228 and 230. An opening 248 is defined in a second end of the second holder 24, adjacent to the first sidewall 281. A slot 250 is defined in the first sidewall 281, adjacent to the opening 248.

The fixing member 60 includes two latches 30 and an elastic element 40.

Each latch 30 includes a substantially bar-shaped main body 32 defining a pivot hole 34 in a first end of the main body 32, an operation portion 36 and a tab 38 respectively perpendicularly extending from a center and a second end of the main body 32. An antiskid portion 360 is formed on a distal end of the operation portion 36, for conveniently operating the operation portion 36. The operation portion 36 defines an engaging hole 362 extending through opposite sides of the operation portion 36, adjacent to the main body 32 and parallel to an extension direction of the main body 32.

The elastic element 40 is a torsion spring, and includes a helical portion 42 and two feet 44 extending from opposite ends of the helical portion 42.

Figure 3:
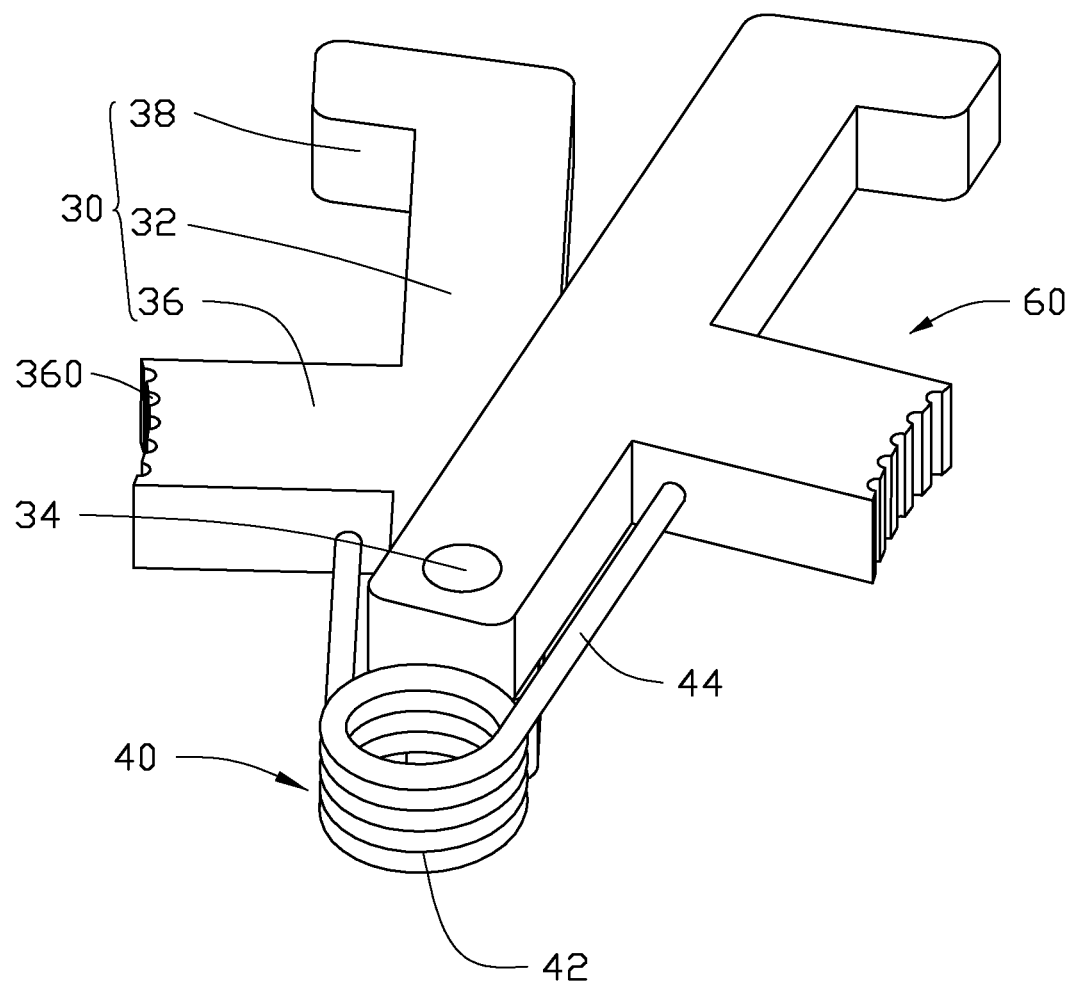
FIG. 3 is an assembled, isometric view of the fixing member of FIG. 2.
Figure 4:
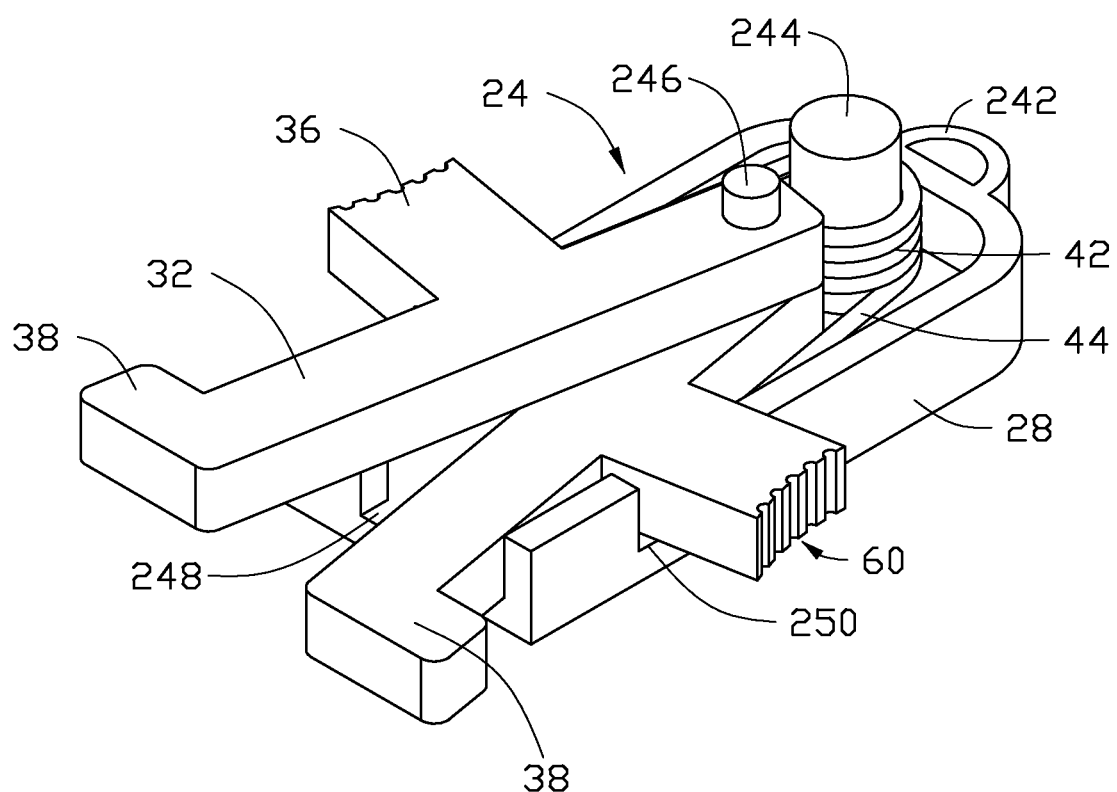
FIG. 4 is an assembled, isometric view of the fixing member mounted to the second holder of FIG. 2.

Referring to FIGS. 3 and 4, in assembly, the latches 30 are stacked up with the tabs 38 extending away from each other, and the pivot holes 34 in alignment with each other. The elastic element 40 is mounted to the latches 30, with the helical portion 42 blocked by the first ends of the latches 30 and the feet 44 respectively engaging in the engaging holes 362 of the latches 30.

The fixing member 60 is mounted to the second holder 24. The first and second posts 244 and 246 respectively rotatably extend through the helical portion 42 and the pivot holes 34. The operation portion 36 and the tab 38 of the bottom latch 30 respectively extend through the slot 250 and the opening 248.

Referring to FIG. 1 again, the first holder 22 is covered on the second holder 24. The operation portion 36 and the tab 38 of the top latch 30 respectively extend through the slot and the opening 224 of the first holder 22. The openings 224 and 248 are partly communicating with each other. The first and second posts 244 and 246 extend through the first through hole 228 and the second through hole 230, respectively. The hook hole 223 of the first holder 22 is in alignment with the hook hole 243 of the second holder 24. In this embodiment, the first holder 22 is soldered to the second holder 24. In other embodiments, the first holder 22 can be mounted to the second holder 24 with screws, or can be latched to the second holder 24 with hooks.

In this embodiment, the hanging portion 50 is a circular rope extending through the hook holes 223 and 243 of the projections 222 and 242.

Referring to FIG. 5, in use, the operation portions 36 are pressed toward each other. The latches 30 rotate about the second post 246, thereby deforming the elastic element 40. The tabs 38 move toward each other, allowing the tabs 38 to extend through the smaller part 122 of the fixing hole 12 of the notebook computer 10 to enter the larger part 120 of the fixing hole 12. The operation portions 36 are then released, and the elastic element 40 is restored to balk the latches 30 to rotate back. The tabs 38 move away from each other and are blocked by a an inner surface of the sidewall 11 at opposite sides of the smaller part 122 of the fixing hole 12.

The hanging portion 50 can be latched to a hook to hang the notebook computer 10.

It is believed that the present embodiments and their advantages will be understood from the foregoing description, and they will be apparent that various changes may be made thereto without departing from the spirit and scope of the description or sacrificing all of their material advantages, the examples hereinbefore described merely being exemplary embodiments.

What is claimed is:

1. A suspension apparatus, comprising:
   a casing;
   a fixing member received in the casing, the fixing member comprising two latches, first ends of the latches rotatably connected to each other, each latch comprising a tab extending from a second end of the latch and extending through a first end of the casing, and an operation portion extending from the latch and extending through one of opposite sides of the casing, the latches to rotate relative to each other to drive the tabs of the latches closer or farther apart; and
   a hanging portion extending from a second end of the casing;
   wherein the casing comprises a first holder and a second holder covered on the first holder, ends of the first and second holders at a second end of the casing each form a projection, and the hanging portion is a circular rope extending through the projections of the first and second holders.

2. The suspension apparatus of claim 1, further comprising an elastic element mounted between the first ends of the latches to bias the latches to rotate to drive the tabs of the latches farther apart.

3. The suspension apparatus of claim 2, wherein the elastic element is a torsion spring comprising two feet mounted to the latches, respectively.

4. The suspension apparatus of claim 3, wherein a first post is formed from the casing, the elastic element further comprises a helical portion fitting about the first post.

5. The suspension apparatus of claim 1, wherein the first and second holders each comprise a board and two sidewalls extending from opposite sides of the board, and the sidewalls each define a slot for the operation portions of the latches extending through.

6. The suspension apparatus of claim 5, wherein ends of the first and second holders at the first end of the casing each define an opening, respectively allowing the tabs of the corresponding latches to extend through.

7. The suspension apparatus of claim 6, wherein the openings of the first and second holders partly communicate with each other.

8. The suspension apparatus of claim 7, further comprising a torsion spring, wherein a first post extends from the second holder, the spring comprises a helical portion fitting about the first post, and two feet extending from opposite ends of the helical portion and fixed to the operation portions.

9. The suspension device of claim 8, wherein a second post extends from the second holder, the first ends of the latches rotatably fit about the second post.

10. The suspension apparatus of claim 9, wherein the board of the first holder defines a first through hole and a second through hole for the first and second posts extending through, respectively.

11. An assembly comprising:
    a device defining a substantially T-shaped fixing hole therein, the fixing hole comprising a larger part defined in the device and a smaller part communicating the larger part and an outer surface of the device; and
    a suspension apparatus comprising:
      a fixing member comprising two latches, first ends of the latches rotatably connected to each other, second ends of the latches extending away from each other, each latch comprising a tab extending from the second end of the latch, wherein the latches rotate relative to each other to drive the tabs to extend through the smaller part of the fixing hole of the device to enter the larger part of the fixing hole; wherein in response to the tabs being located in the larger part of the fixing hole and the second ends of the latches extending away from each other, the tabs resist against an inner surface of the device at opposite sides of the smaller part of the fixing hole; and
      a hanging portion formed at the first ends of the latches to be connected to an object, thereby hanging the device;
      wherein each latch further comprises an operation portion substantially extending from a center of the latch, the suspension apparatus further comprise a first holder, and a second holder covered on the first holder to enclose the fixing member, each of the first and second holders comprises a board and opposite sidewalls extending from opposite sides of the board, each of the sidewalls defines a slot for the operation portion of a corresponding latch extending through to be exposed out of the sidewall.

12. The assembly of claim 11, wherein each of the first and second holders defines an opening through which the tab of a corresponding latch extends through to be located out of the corresponding holder.

13. The assembly of claim 12, wherein the openings of the first and second holders are partly communicated with each other.

14. The assembly of claim 11, wherein the suspension apparatus further comprise a first holder, a second holder covered on the first holder to enclose the fixing member, and a torsion spring, the tabs of the latches extend out of rear ends of the first and second holders, each of the first and second holders comprises a board, a first post extends from the board of the second holder toward the board of the first holder, the torsion spring fits about the first post, two feet of the torsion spring are fixed to the latches, respectively.

15. The assembly of claim 14, wherein a second post extends from the board of the second holder toward the board of the first holder, the first ends of the latches are stacked on the board of the second holder and rotatably fit about the second post.

16. The assembly of claim 15, wherein the board of the first holder defines a first through hole and a second through hole, distal ends of the first and second posts extend through the first and second through holes, respectively.

17. A suspension apparatus, comprising:
    a casing;
    a fixing member received in the casing, the fixing member comprising two latches, first ends of the latches rotatably connected to each other, each latch comprising a tab extending from a second end of the latch and extending through a first end of the casing, and an operation portion extending from the latch and extending through one of opposite sides of the casing, and the latches rotating relative to each other to drive the tabs of the latches closer or farther apart; and a hanging portion extending from a second end of the casing;

wherein the tabs extend away from each other, the tabs move toward each other to extend through a smaller part of a T-shaped hole, and then apart from each other to be received in a larger part of the T-shaped hole; the tabs resists against walls bounding the smaller part of the T-shaped hole and inner walls of the larger part which are perpendicular to the walls bounding the smaller part.

\* \* \* \* \*